Patented Feb. 6, 1923.

1,444,160

UNITED STATES PATENT OFFICE.

THOR MEJDELL, OF SKOIEN, NEAR CHRISTIANIA, NORWAY, ASSIGNOR TO AKTIE-SELSKABET LABRADOR, OF CHRISTIANIA, NORWAY.

METHOD FOR THE PRECIPITATION OF IRON IN ALUMINOUS SOLUTIONS.

No Drawing. Application filed November 17, 1921. Serial No. 515,994.

*To all whom it may concern:*

Be it known that I, THOR MEJDELL, a citizen of the Kingdom of Norway, residing at Skoien, near Christiania, Norway, have invented certain new and useful Improvements in Methods for the Precipitation of Iron in Aluminous Solutions, of which the following is a specification.

The present invention is based on the previously known method for precipitating iron in mineral acid aluminous solutions containing iron, in trivalent form by partly neutralizing the acid set free by the hydrolysis of the aluminum salt and by adding certain iron compounds in order to considerably hasten the process of precipitation.

In order that the iron may be precipitated so completely as to obtain alumina sufficiently free of iron for technical use, the precipitation must be effected in solutions in which the H-ionic concentration does not exceed a certain maximum, and it appears that an iron compound that has a catalytical influence on the precipitation loses its activity after being used in such solutions, and consequently cannot be used continually as a catalyzer.

I have discovered that this difficulty can be surmounted by treating the iron compound with diluted acid for some time before it is used again as a catalyzer. On undergoing this treatment the iron compound will completely recover its catalytical capacity and consequently shorten the time of precipitation.

The same result will be obtained if the iron compound is treated with an aluminous solution having a higher H-ionic concentration than that in which the iron is completely precipitated. In this manner the technical operation of the process will be considerably simplified in that the activation will take place in the aluminous solution from which the iron is to be removed. The iron compound is added to the acid aluminous solution from which the iron is to be removed and is activated during a short time of treatment, whereupon the iron precipitation is effected by chemical neutralization or by expelling acid by evaporation.

By adding active iron compounds to mineral acid aluminous solution having a higher H-ionic concentration than that in which the iron is completely precipitated, it has been found that the added iron compounds have the effect of precipitating a large quantity of the iron content of the solution in quite a short space of time. The basic iron compounds precipitated in the acid solution have the great advantage of being active. This is of special importance when the aluminous solution is produced by dissolving in acids a raw material containing a large quantity of iron, in that the activating process can be combined with the process of dissolving the raw material. For this purpose active iron compound is added during the process of dissolving the raw material and the inflow of raw material and acid is regulated so that the H-ionic concentration of the solution is kept sufficiently low that most of the iron which is dissolved is re-precipitated but sufficiently high to prevent complete precipitation, whereby the iron compound is precipitated in the dissolving apparatus in an active condition. If the solution formed in the dissolving apparatus is then drawn off for instance, decanted, so that iron compound is continually present during the process of solution, new active iron compound will be continuously produced during the dissolving process and if the raw material used contains a sufficient amount of acid soluble iron, sufficient active compound will be formed during the dissolving process that when the process is once started it will be unnecessary to add a further quantity of iron oxide. The final precipitation is effected in the solution drawn off from the dissolving apparatus by partial neutralization.

I claim:

1. In the method of precipitating iron in mineral acid aluminous solutions containing iron in trivalent form by partly neutralizing the acid freed by the hydrolysis of aluminum salt and by adding an iron compound from a previous precipitation as catalyzer, the step comprising activating the iron compound by treating the same with acid or with a solution of a higher H-ionic concentration than that in which the final precipitation of iron is effected.

2. The method as defined in claim 1 in which the iron compound is activated in the aluminous solution from which the iron is to be removed and thereafter partially neutralizing the aluminous solution.

3. The method as defined in claim 1 in which the iron compound is added to the aluminous solution during the dissolution of the aluminous material in acid to form said solution, the dissolution being regulated to maintain in the aluminous solution a H-ionic concentration sufficiently low that a substantial proportion of the iron content of the aluminous material dissolved is precipitated but sufficiently high that the dissolved iron is not completely precipitated, and thereafter partially neutralizing the aluminous solution.

4. Method according to claim 3 in which the raw aluminous material employed contains sufficient acid soluble iron that in effecting solution of the aluminous mineral sufficient iron compound is precipitated in active condition to maintain, after initial addition of some of the catalyzer, reaction conditions during both the solution and neutralization steps.

In testimony whereof, I affix my signature.

THOR MEJDELL.